US009310794B2

(12) United States Patent
Arunachalam et al.

(10) Patent No.: US 9,310,794 B2
(45) Date of Patent: Apr. 12, 2016

(54) POWER SUPPLY FOR INDUSTRIAL PROCESS FIELD DEVICE

(75) Inventors: Jawahar Arunachalam, Tirunelveli (IN); Udayashankar Bangalore Kasturi, Bangalore (IN)

(73) Assignee: Rosemount Inc., Eden Prairie, MN (US)

( * ) Notice: Subject to any disclaimer, the term of this patent is extended or adjusted under 35 U.S.C. 154(b) by 174 days.

(21) Appl. No.: 13/282,681

(22) Filed: Oct. 27, 2011

(65) Prior Publication Data

US 2013/0106369 A1 May 2, 2013

(51) Int. Cl.
G05F 1/00 (2006.01)
G05B 19/042 (2006.01)

(52) U.S. Cl.
CPC .. *G05B 19/0423* (2013.01); *G05B 2219/25428* (2013.01); *Y02B 60/50* (2013.01); *Y02P 80/114* (2015.11)

(58) Field of Classification Search
USPC ......... 323/266, 268, 271, 272, 273, 274, 275, 323/279, 281, 303, 282–285
See application file for complete search history.

(56) References Cited

U.S. PATENT DOCUMENTS

| 2,533,339 | A | 12/1950 | Willenborg | 177/311 |
| 2,640,667 | A | 6/1953 | Winn | 248/65 |
| 2,883,489 | A | 4/1959 | Eadie, Jr. et al. | 335/148 |
| 3,012,432 | A | 12/1961 | Moore et al. | 73/40 |
| 3,218,863 | A | 11/1965 | Calvert | 73/398 |
| 3,229,759 | A | 1/1966 | Grover et al. | 165/105 |
| 3,232,712 | A | 2/1966 | Stearns | 23/255 |
| 3,249,833 | A | 5/1966 | Vosteen | 317/246 |
| 3,374,112 | A | 3/1968 | Danon | 117/226 |
| 3,557,621 | A | 1/1971 | Ferran | 73/398 |
| 3,568,762 | A | 3/1971 | Harbaugh | 165/105 |
| 3,612,851 | A | 10/1971 | Fowler | 362/30 |
| 3,631,264 | A | 12/1971 | Morgan | 327/309 |
| 3,633,053 | A | 1/1972 | Peters et al. | 310/15 |
| 3,697,835 | A | 10/1972 | Satori | 317/246 |

(Continued)

FOREIGN PATENT DOCUMENTS

| CH | 672 368 A5 | 11/1989 |
| CN | 06 199284 A | 7/1994 |

(Continued)

OTHER PUBLICATIONS

Decision of Refusal for Japanese Patent Application No. 2011-514604, dispatched on Jan. 29, 2013, 8 pages.

(Continued)

*Primary Examiner* — Nguyen Tran
(74) *Attorney, Agent, or Firm* — Westman, Champlin & Koehler, P.A.

(57) ABSTRACT

A wireless industrial process field device for use in controlling or monitoring a process variable of an industrial process includes a process interface element configured to sense or control the process variable of the industrial process. Process device circuitry includes a process interface circuit configured to measure or control the process variable of the industrial process with the process interface element. Wireless communication circuitry is configured for wireless communication. Power supply circuitry is configured to provide power to the process device circuitry from a power storage element at an output voltage. A low drop out (LDO) voltage regulator is configured to reduce the output voltage. A boost converter is configured to increase the output voltage.

14 Claims, 3 Drawing Sheets

(56) References Cited

U.S. PATENT DOCUMENTS

| | | | |
|---|---|---|---|
| D225,743 S | 1/1973 | Seltzer | D10/102 |
| 3,742,450 A | 6/1973 | Weller | 375/257 |
| 3,808,480 A | 4/1974 | Johnston | 317/256 |
| 3,881,962 A | 5/1975 | Rubinstein | 136/209 |
| 3,885,432 A | 5/1975 | Herzl | 73/861.22 |
| 3,924,219 A | 12/1975 | Braun | 338/34 |
| 3,931,532 A | 1/1976 | Byrd | 310/4 |
| 4,005,319 A | 1/1977 | Nilsson et al. | 310/8.3 |
| 4,008,619 A | 2/1977 | Alcaide et al. | 73/398 |
| 4,042,757 A | 8/1977 | Jones | 429/104 |
| 4,063,349 A | 12/1977 | Passler et al. | 29/627 |
| 4,084,155 A | 4/1978 | Herzl et al. | 340/870.39 |
| 4,116,060 A | 9/1978 | Frederick | 73/861.22 |
| 4,125,122 A | 11/1978 | Stachurski | 136/205 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,287,553 A | 9/1981 | Braunlich | 361/283 |
| 4,295,179 A | 10/1981 | Read | 361/600 |
| 4,322,724 A | 3/1982 | Grudzinski | 340/595 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,361,045 A | 11/1982 | Iwasaki | 73/654 |
| 4,370,890 A | 2/1983 | Frick | 73/718 |
| 4,383,801 A | 5/1983 | Pryor | 416/17 |
| 4,389,895 A | 6/1983 | Rud, Jr. | 73/724 |
| 4,390,321 A | 6/1983 | Langlois et al. | 417/15 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,459,537 A | 7/1984 | McWhorter | 323/224 |
| 4,475,047 A | 10/1984 | Ebert | 307/66 |
| 4,476,853 A | 10/1984 | Arbogast | 126/578 |
| 4,485,670 A | 12/1984 | Camarda et al. | 73/179 |
| 4,490,773 A | 12/1984 | Moffatt | 361/283 |
| 4,510,400 A | 4/1985 | Kiteley | 307/66 |
| 4,542,436 A | 9/1985 | Carusillo | 361/283 |
| 4,562,742 A | 1/1986 | Bell | 73/718 |
| 4,570,217 A | 2/1986 | Allen et al. | 700/19 |
| 4,590,466 A | 5/1986 | Wiklund et al. | 340/870.28 |
| 4,639,542 A | 1/1987 | Bass et al. | 136/210 |
| 4,670,733 A | 6/1987 | Bell | 338/36 |
| 4,701,938 A | 10/1987 | Bell | 375/257 |
| 4,704,607 A | 11/1987 | Teather et al. | 340/825.07 |
| 4,749,993 A | 6/1988 | Szabo et al. | 340/870.31 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,982,412 A | 1/1991 | Gross | 377/6 |
| 5,009,311 A | 4/1991 | Schenk | 206/332 |
| 5,014,176 A | 5/1991 | Kelleher et al. | 363/26 |
| 5,023,746 A | 6/1991 | Epstein | 361/56 |
| 5,025,202 A | 6/1991 | Ishii et al. | 220/101 |
| 5,045,963 A | 9/1991 | Hansen et al. | 361/87 |
| 5,060,295 A | 10/1991 | Borras et al. | 455/186 |
| 5,079,562 A | 1/1992 | Yarsunas et al. | 343/792 |
| 5,094,109 A | 3/1992 | Dean et al. | 73/718 |
| 5,107,366 A | 4/1992 | Huang et al. | 359/223.1 |
| D331,370 S | 12/1992 | Williams | D10/46 |
| 5,168,419 A | 12/1992 | Delatorre | 361/283 |
| 5,170,671 A | 12/1992 | Miau et al. | 73/861.22 |
| 5,194,819 A | 3/1993 | Briefer | 73/718 |
| 5,223,763 A | 6/1993 | Chang | 310/339 |
| 5,230,250 A | 7/1993 | Delatorre | 73/733 |
| 5,233,875 A | 8/1993 | Obermeier et al. | 73/718 |
| D345,107 S | 3/1994 | Williams | D10/46 |
| 5,313,831 A | 5/1994 | Beckman | 73/204.24 |
| 5,329,818 A | 7/1994 | Frick et al. | 73/708 |
| 5,412,535 A | 5/1995 | Chao et al. | 361/700 |
| 5,492,016 A | 2/1996 | Pinto et al. | 73/724 |
| 5,495,769 A | 3/1996 | Broden et al. | 73/18 |
| 5,506,757 A | 4/1996 | Brorby | 361/796 |
| 5,531,936 A | 7/1996 | Kanatzidis et al. | 252/587 |
| 5,535,243 A | 7/1996 | Voegele et al. | 375/259 |
| 5,542,300 A | 8/1996 | Lee | 73/724 |
| 5,546,804 A | 8/1996 | Johnson et al. | 73/431 |
| 5,554,809 A | 9/1996 | Tobita et al. | 73/700 |
| 5,554,922 A | 9/1996 | Kunkel | 322/3 |
| 5,599,172 A | 2/1997 | McCabe | 417/334 |
| 5,606,513 A | 2/1997 | Louwagie et al. | 702/138 |
| 5,610,552 A | 3/1997 | Schlesinger et al. | 327/560 |
| 5,614,128 A | 3/1997 | Kanatzidis et al. | 252/582 |
| 5,618,471 A | 4/1997 | Kanatzidis et al. | 252/582 |
| 5,637,802 A | 6/1997 | Frick et al. | 73/724 |
| 5,642,301 A | 6/1997 | Warrior et al. | 364/571.02 |
| 5,644,185 A | 7/1997 | Miller | 310/306 |
| 5,656,782 A | 8/1997 | Powell, II et al. | 73/756 |
| 5,665,899 A | 9/1997 | Willcox | 731/1.63 |
| 5,672,832 A | 9/1997 | Cucci et al. | 73/861.52 |
| 5,682,476 A | 10/1997 | Tapperson et al. | 395/200.05 |
| 5,705,978 A | 1/1998 | Frick et al. | 340/511 |
| 5,710,552 A | 1/1998 | McCoy et al. | 340/870.21 |
| 5,722,249 A | 3/1998 | Miller, Jr. | 62/238.2 |
| 5,726,845 A | 3/1998 | Ho | 361/86 |
| 5,726,846 A | 3/1998 | Houbre | 361/93 |
| 5,754,419 A | 5/1998 | Ho | 363/89 |
| 5,757,608 A | 5/1998 | Bernot et al. | 361/283.4 |
| 5,764,891 A | 6/1998 | Warrior | 710/72 |
| 5,787,120 A | 7/1998 | Louagie et al. | 375/257 |
| 5,793,963 A | 8/1998 | Tapperson et al. | 395/200.31 |
| 5,803,604 A | 9/1998 | Pompei | 374/181 |
| 5,811,201 A | 9/1998 | Skowronski | 429/17 |
| 5,851,083 A | 12/1998 | Palan | 403/337 |
| 5,870,695 A | 2/1999 | Brown et al. | 702/138 |
| 5,872,494 A | 2/1999 | Palan et al. | 333/252 |
| 5,899,962 A | 5/1999 | Louwagie et al. | 702/138 |
| 5,911,162 A | 6/1999 | Denner | 73/718 |
| 5,929,372 A | 7/1999 | Oudoire et al. | 136/208 |
| 5,954,526 A | 9/1999 | Smith | 439/136 |
| 5,957,727 A | 9/1999 | Page, Jr. | 439/607.58 |
| 5,978,658 A | 11/1999 | Shoji | 455/66 |
| 5,992,240 A | 11/1999 | Tsuruoka et al. | 73/718 |
| 6,013,204 A | 1/2000 | Kanatzidis et al. | 252/584 |
| 6,038,927 A | 3/2000 | Karas | 73/706 |
| 6,062,095 A | 5/2000 | Mulrooney et al. | 73/866.5 |
| 6,079,276 A | 6/2000 | Frick et al. | 73/18 |
| 6,104,759 A | 8/2000 | Carkner et al. | 375/295 |
| 6,109,979 A | 8/2000 | Garnett | 439/709 |
| 6,126,327 A | 10/2000 | Bi et al. | 709/221 |
| 6,127,739 A | 10/2000 | Appa | 290/55 |
| 6,150,798 A | 11/2000 | Ferry et al. | 323/273 |
| D439,177 S | 3/2001 | Fandrey et al. | D10/46 |
| D439,178 S | 3/2001 | Fandrey et al. | D10/46 |
| D439,179 S | 3/2001 | Fandrey et al. | D10/46 |
| D439,180 S | 3/2001 | Fandrey et al. | D10/85 |
| D439,181 S | 3/2001 | Fandrey et al. | D10/46 |
| D441,672 S | 5/2001 | Fandrey et al. | D10/52 |
| 6,236,096 B1 | 5/2001 | Chang et al. | 257/419 |
| 6,236,334 B1 | 5/2001 | Tapperson et al. | 340/825 |
| 6,255,010 B1 | 7/2001 | George et al. | 429/30 |
| 6,282,247 B1 | 8/2001 | Shen | 375/285 |
| 6,295,875 B1 | 10/2001 | Frick et al. | 73/718 |
| 6,312,617 B1 | 11/2001 | Kanatzidis et al. | 252/62.3 |
| 6,326,764 B1 | 12/2001 | Virtudes | 320/101 |
| 6,338,283 B1 | 1/2002 | Blazquez Navarro | 73/865.8 |
| 6,360,277 B1 | 3/2002 | Ruckley et al. | 709/250 |
| 6,366,436 B1 | 4/2002 | Maier et al. | 361/93.9 |
| 6,385,972 B1 | 5/2002 | Fellows | 60/517 |
| 6,405,139 B1 | 6/2002 | Kicinski et al. | 702/33 |
| 6,429,786 B1 | 8/2002 | Bansemir et al. | 340/870.27 |
| 6,441,747 B1 | 8/2002 | Khair et al. | 340/870.16 |
| 6,457,367 B1 | 10/2002 | Behm et al. | 73/753 |
| 6,480,699 B1 | 11/2002 | Lovoi | 455/41.2 |
| 6,484,107 B1 | 11/2002 | Roper et al. | 702/50 |
| 6,487,912 B1 | 12/2002 | Behm et al. | 73/753 |
| 6,504,489 B1 | 1/2003 | Westfield et al. | 340/870.3 |

(56) References Cited

U.S. PATENT DOCUMENTS

| | | |
|---|---|---|
| 6,508,131 B2 | 1/2003 | Frick .............................. 73/756 |
| 6,510,740 B1 | 1/2003 | Behm et al. ..................... 73/708 |
| 6,511,337 B1 | 1/2003 | Fandrey et al. ............... 439/320 |
| D471,829 S | 3/2003 | Dennis et al. .................. D10/85 |
| D472,831 S | 4/2003 | Dennis et al. .................. D10/85 |
| 6,546,805 B2 | 4/2003 | Fandrey et al. ................ 73/753 |
| 6,553,076 B1 | 4/2003 | Huang ......................... 375/257 |
| 6,563,908 B1 | 5/2003 | Enck, Jr. ...................... 378/123 |
| 6,568,279 B2 | 5/2003 | Behm et al. ..................... 73/753 |
| 6,571,132 B1 | 5/2003 | Davis et al. ...................... 700/2 |
| 6,574,515 B1 | 6/2003 | Kirkpatrick et al. ............ 700/19 |
| 6,593,857 B1 | 7/2003 | Roper et al. ................ 340/870.3 |
| 6,609,427 B1 | 8/2003 | Westfield et al. ................. 73/753 |
| 6,640,308 B1 | 10/2003 | Keyghobad et al. ........... 713/300 |
| 6,661,220 B1 | 12/2003 | Glehr ........................ 324/207.17 |
| 6,662,662 B1 | 12/2003 | Nord et al. ...................... 73/715 |
| 6,667,594 B2 | 12/2003 | Chian ........................... 318/696 |
| 6,680,690 B1 | 1/2004 | Nilsson et al. ................. 342/124 |
| 6,690,182 B2 | 2/2004 | Kelly et al. .................... 324/700 |
| 6,711,446 B2 | 3/2004 | Kirkpatrick et al. ............ 700/19 |
| 6,747,573 B1 | 6/2004 | Gerlach et al. ........... 340/870.21 |
| 6,765,968 B1 | 7/2004 | Nelson et al. ................. 375/257 |
| 6,771,560 B2 | 8/2004 | Lyon et al. ...................... 367/13 |
| 6,774,814 B2 | 8/2004 | Hilleary ................... 340/870.07 |
| 6,778,100 B2 | 8/2004 | Schempf .................. 340/870.07 |
| 6,792,259 B1 | 9/2004 | Parise ......................... 455/343.1 |
| 6,823,072 B1 | 11/2004 | Hoover ............................ 381/7 |
| 6,838,859 B2 | 1/2005 | Shah ............................. 322/38 |
| 6,839,546 B2 | 1/2005 | Hedtke ....................... 455/67.11 |
| 6,839,790 B2 | 1/2005 | Barros De Almeida et al. ............................. 710/305 |
| 6,843,110 B2 | 1/2005 | Deane et al. ................. 73/114.35 |
| 6,891,477 B2 | 5/2005 | Aronstam ..................... 340/606 |
| 6,891,838 B1 | 5/2005 | Petite et al. ................... 370/401 |
| 6,898,980 B2 | 5/2005 | Behm et al. ..................... 73/756 |
| 6,904,295 B2 | 6/2005 | Yang ............................ 455/522 |
| 6,907,383 B2 | 6/2005 | Eryurek et al. ................ 702/183 |
| 6,910,332 B2 | 6/2005 | Fellows .......................... 60/520 |
| 6,942,728 B2 | 9/2005 | Caillat et al. ...................... 117/3 |
| 6,961,665 B2 | 11/2005 | Slezak ............................ 702/61 |
| 6,984,899 B1 | 1/2006 | Rice ............................. 290/44 |
| 6,995,677 B2 | 2/2006 | Aronstam et al. ............. 340/606 |
| 6,995,685 B2 | 2/2006 | Randall ..................... 340/870.39 |
| 7,010,294 B1 | 3/2006 | Pyotsia et al. ................. 455/420 |
| 7,036,983 B2 | 5/2006 | Green et al. ................... 374/179 |
| 7,043,250 B1 | 5/2006 | DeMartino ................... 455/445 |
| 7,058,542 B2 | 6/2006 | Hauhia et al. ................. 702/183 |
| 7,073,394 B2 | 7/2006 | Foster ........................ 73/861.22 |
| 7,088,285 B2 | 8/2006 | Smith ............................ 342/124 |
| 7,109,883 B2 | 9/2006 | Trimble et al. ........... 340/870.16 |
| 7,116,036 B2 | 10/2006 | Balasubramaniam et al. ............................. 310/322 |
| 7,129,663 B2 | 10/2006 | Suzuki ........................... 318/504 |
| 7,136,725 B1 | 11/2006 | Paciorek et al. .............. 700/295 |
| 7,173,343 B2 | 2/2007 | Kugel ........................... 290/1 R |
| 7,197,953 B2 | 4/2007 | Olin ............................ 73/866.5 |
| 7,233,745 B2 | 6/2007 | Loechner ..................... 398/128 |
| 7,262,693 B2 | 8/2007 | Karschnia et al. ............. 340/508 |
| 7,271,679 B2 | 9/2007 | Lundberg et al. ............. 333/24 |
| 7,301,454 B2 | 11/2007 | Seyfang et al. .......... 340/539.26 |
| 7,319,191 B2 | 1/2008 | Poon et al. ................. 174/50.62 |
| 7,329,959 B2 | 2/2008 | Kim et al. ......................... 290/2 |
| 7,351,098 B2 | 4/2008 | Gladd et al. .................. 439/578 |
| 7,504,827 B2 * | 3/2009 | Kataoka ......................... 323/268 |
| 7,518,553 B2 | 4/2009 | Zhang et al. ........... 343/700 MS |
| 7,539,593 B2 | 5/2009 | Machacek ..................... 702/127 |
| 7,560,907 B2 | 7/2009 | Nelson ........................... 322/37 |
| 7,626,141 B2 | 12/2009 | Rodriguez-Medina et al. ............................. 219/260 |
| 7,726,017 B2 | 6/2010 | Evans et al. ..................... 29/854 |
| 7,835,119 B2 | 11/2010 | Florence et al. ............... 361/18 |
| 7,983,049 B2 | 7/2011 | Leifer et al. ................... 361/728 |
| 8,005,514 B2 | 8/2011 | Saito et al. .................... 455/572 |
| 8,150,462 B2 | 4/2012 | Guenter et al. ............... 455/557 |
| 8,160,535 B2 | 4/2012 | Kielb et al. .................... 455/343 |
| 8,180,948 B2 | 5/2012 | Kreider et al. ................ 710/313 |
| 8,208,581 B2 | 6/2012 | Westfield et al. .............. 375/295 |
| 8,452,255 B2 | 5/2013 | Orth .......................... 455/343.5 |
| 8,538,560 B2 | 9/2013 | Brown et al. .................... 700/22 |
| 2001/0025349 A1 | 9/2001 | Sharood et al. ............... 713/340 |
| 2002/0011115 A1 | 1/2002 | Frick .............................. 73/718 |
| 2002/0029130 A1 | 3/2002 | Eryurek et al. ................ 702/183 |
| 2002/0029900 A1 | 3/2002 | Wimberger Friedl et al. ............................. 174/258 |
| 2002/0065631 A1 | 5/2002 | Loechner ..................... 702/188 |
| 2002/0082799 A1 | 6/2002 | Pramanik ..................... 702/130 |
| 2002/0095520 A1 | 7/2002 | Wettstein et al. ............. 709/253 |
| 2002/0097031 A1 | 7/2002 | Cook et al. .................... 323/273 |
| 2002/0105968 A1 | 8/2002 | Pruzan et al. ................. 370/465 |
| 2002/0148236 A1 | 10/2002 | Bell ............................... 62/3.3 |
| 2002/0163323 A1 | 11/2002 | Kasai et al. .................... 323/284 |
| 2003/0032993 A1 | 2/2003 | Mickle et al. ................. 600/509 |
| 2003/0042740 A1 | 3/2003 | Holder et al. ................... 290/1 A |
| 2003/0043052 A1 | 3/2003 | Tapperson et al. ........ 640/825.37 |
| 2003/0079553 A1 | 5/2003 | Cain et al. ................... 73/861.27 |
| 2003/0083038 A1 | 5/2003 | Poon et al. ..................... 455/344 |
| 2003/0097521 A1 | 5/2003 | Pfandler et al. ............... 711/103 |
| 2003/0134161 A1 | 7/2003 | Gore et al. ...................... 429/12 |
| 2003/0143958 A1 | 7/2003 | Elias et al. ........................ 455/73 |
| 2003/0167631 A1 | 9/2003 | Hallenbeck .................... 29/835 |
| 2003/0171827 A1 | 9/2003 | Keyes et al. .................... 700/19 |
| 2003/0199778 A1 | 10/2003 | Mickle et al. ................. 600/509 |
| 2003/0204371 A1 | 10/2003 | Sciamanna .................... 702/183 |
| 2004/0081872 A1 | 4/2004 | Herman et al. ................. 429/26 |
| 2004/0085240 A1 | 5/2004 | Faust ............................. 342/124 |
| 2004/0086021 A1 | 5/2004 | Litwin ........................... 374/120 |
| 2004/0124854 A1 | 7/2004 | Slezak ........................... 324/644 |
| 2004/0142733 A1 | 7/2004 | Parise ............................ 455/572 |
| 2004/0159235 A1 | 8/2004 | Marganski et al. ............. 95/116 |
| 2004/0183550 A1 | 9/2004 | Fehrenbach et al. ............ 27/26 |
| 2004/0184517 A1 | 9/2004 | Westfield et al. .............. 375/219 |
| 2004/0199681 A1 | 10/2004 | Hedtke .......................... 710/37 |
| 2004/0200519 A1 | 10/2004 | Sterzel et al. ................. 136/238 |
| 2004/0203421 A1 | 10/2004 | Hedtke ....................... 455/67.11 |
| 2004/0203434 A1 | 10/2004 | Karschnia et al. ......... 455/67.11 |
| 2004/0211456 A1 | 10/2004 | Brown et al. .................. 136/243 |
| 2004/0214543 A1 | 10/2004 | Osone et al. ............... 455/197.2 |
| 2004/0218326 A1 | 11/2004 | Duren et al. .................. 361/93.1 |
| 2004/0242169 A1 | 12/2004 | Albsmeier et al. .............. 455/91 |
| 2004/0249483 A1 | 12/2004 | Wojsznis et al. ................ 700/52 |
| 2004/0259533 A1 | 12/2004 | Nixon et al. ................. 455/414.1 |
| 2005/0011278 A1 | 1/2005 | Brown et al. ............... 73/861.18 |
| 2005/0017602 A1 | 1/2005 | Arms et al. .................... 310/339 |
| 2005/0023858 A1 | 2/2005 | Bingle et al. .................... 296/76 |
| 2005/0029236 A1 | 2/2005 | Gambino et al. ........ 219/121.69 |
| 2005/0040570 A1 | 2/2005 | Asselborn ...................... 266/99 |
| 2005/0046595 A1 | 3/2005 | Blyth ............................ 340/908 |
| 2005/0056106 A1 | 3/2005 | Nelson et al. ................. 73/866.3 |
| 2005/0072239 A1 | 4/2005 | Longsdorf et al. ............. 73/649 |
| 2005/0074324 A1 | 4/2005 | Yoo ............................... 415/4.3 |
| 2005/0076944 A1 | 4/2005 | Kanatzidis et al. ............ 136/239 |
| 2005/0082949 A1 | 4/2005 | Tsujiura ......................... 310/339 |
| 2005/0099010 A1 | 5/2005 | Hirsch ............................ 290/42 |
| 2005/0106927 A1 | 5/2005 | Goto et al. ..................... 439/404 |
| 2005/0109395 A1 | 5/2005 | Seberger ........................ 137/8 |
| 2005/0115601 A1 | 6/2005 | Olsen et al. .................... 136/212 |
| 2005/0118468 A1 | 6/2005 | Adams et al. ................... 429/22 |
| 2005/0122653 A1 | 6/2005 | McCluskey et al. ........... 361/92 |
| 2005/0130605 A1 | 6/2005 | Karschnia et al. ............ 455/90.3 |
| 2005/0132808 A1 | 6/2005 | Brown et al. .................... 73/592 |
| 2005/0134148 A1 | 6/2005 | Buhler et al. .................. 310/339 |
| 2005/0139250 A1 | 6/2005 | DeSteese et al. .............. 136/212 |
| 2005/0146220 A1 | 7/2005 | Hamel et al. .................. 307/44 |
| 2005/0153593 A1 | 7/2005 | Takayanagi et al. .......... 439/352 |
| 2005/0164684 A1 | 7/2005 | Chen et al. ................... 455/414.1 |
| 2005/0197803 A1 | 9/2005 | Eryurek et al. ............... 702/185 |
| 2005/0201349 A1 | 9/2005 | Budampati .................... 370/342 |
| 2005/0208908 A1 | 9/2005 | Karschnia et al. ........... 455/127.1 |
| 2005/0222698 A1 | 10/2005 | Eryurek et al. ................ 700/90 |
| 2005/0228509 A1 | 10/2005 | James ............................ 700/19 |
| 2005/0235758 A1 | 10/2005 | Kowal et al. ................. 73/891.29 |
| 2005/0242979 A1 | 11/2005 | Hamilton et al. .............. 341/144 |
| 2005/0245291 A1 | 11/2005 | Brown et al. .................. 455/572 |
| 2005/0276233 A1 | 12/2005 | Shepard et al. ................ 370/254 |

(56) References Cited

U.S. PATENT DOCUMENTS

| | | | |
|---|---|---|---|
| 2005/0281215 A1 | 12/2005 | Budampati et al. | 370/328 |
| 2005/0289276 A1 | 12/2005 | Karschnia et al. | 710/305 |
| 2006/0002368 A1 | 1/2006 | Budampati et al. | 370/351 |
| 2006/0028327 A1 | 2/2006 | Amis | 340/431 |
| 2006/0036404 A1 | 2/2006 | Wiklund et al. | 702/183 |
| 2006/0047480 A1 | 3/2006 | Lenz et al. | 702/183 |
| 2006/0058847 A1 | 3/2006 | Lenz et al. | 607/5 |
| 2006/0060236 A1 | 3/2006 | Kim et al. | 136/203 |
| 2006/0063522 A1 | 3/2006 | McFarland | 455/423 |
| 2006/0077917 A1 | 4/2006 | Brahmajosyula et al. | 370/310 |
| 2006/0092039 A1 | 5/2006 | Saito et al. | 340/825.37 |
| 2006/0111058 A1 | 5/2006 | Grant et al. | 455/127.1 |
| 2006/0116102 A1 | 6/2006 | Brown et al. | |
| 2006/0128689 A1 | 6/2006 | Gomtsyan et al. | 514/217.01 |
| 2006/0131428 A1 | 6/2006 | Wang et al. | 235/492 |
| 2006/0142875 A1 | 6/2006 | Keyes, IV et al. | 700/1 |
| 2006/0148410 A1 | 7/2006 | Nelson et al. | 455/67.11 |
| 2006/0181406 A1 | 8/2006 | Petite et al. | 340/521 |
| 2006/0194547 A1 | 8/2006 | Davis | 455/69 |
| 2006/0227729 A1 | 10/2006 | Budampati et al. | 370/278 |
| 2006/0274644 A1 | 12/2006 | Budampati et al. | 370/216 |
| 2006/0274671 A1 | 12/2006 | Budampati et al. | 370/254 |
| 2006/0278023 A1 | 12/2006 | Garneyer et al. | 73/862.333 |
| 2006/0282580 A1 | 12/2006 | Russell et al. | 710/62 |
| 2006/0287001 A1 | 12/2006 | Budampati et al. | 455/552.1 |
| 2006/0290328 A1 | 12/2006 | Orth | 323/218 |
| 2007/0006528 A1 | 1/2007 | Diebold et al. | 48/197 R |
| 2007/0024256 A1* | 2/2007 | Chou | 323/268 |
| 2007/0030816 A1 | 2/2007 | Kolavennu | 370/252 |
| 2007/0030832 A1 | 2/2007 | Gonia et al. | 370/338 |
| 2007/0039371 A1 | 2/2007 | Omata et al. | 73/9 |
| 2007/0054630 A1 | 3/2007 | Scheible et al. | 455/90.3 |
| 2007/0055463 A1 | 3/2007 | Florenz et al. | 702/50 |
| 2007/0079250 A1 | 4/2007 | Bump et al. | |
| 2007/0135867 A1 | 6/2007 | Klosterman et al. | 607/60 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0273496 A1 | 11/2007 | Hedtke | 340/506 |
| 2007/0275755 A1 | 11/2007 | Chae et al. | 455/557 |
| 2007/0279009 A1 | 12/2007 | Kobayashi | 320/166 |
| 2007/0280144 A1 | 12/2007 | Hodson et al. | 370/312 |
| 2007/0280178 A1 | 12/2007 | Hodson et al. | 370/338 |
| 2007/0280286 A1 | 12/2007 | Hodson et al. | 370/466 |
| 2007/0280287 A1 | 12/2007 | Samudrala et al. | 370/466 |
| 2007/0282463 A1 | 12/2007 | Hodson et al. | 700/20 |
| 2007/0285224 A1 | 12/2007 | Karschnia et al. | 340/538 |
| 2007/0288204 A1 | 12/2007 | Gienke et al. | 702/188 |
| 2008/0010600 A1 | 1/2008 | Katano | 715/748 |
| 2008/0030423 A1 | 2/2008 | Shigemoto | 343/872 |
| 2008/0054645 A1 | 3/2008 | Kulkarni et al. | |
| 2008/0079641 A1 | 4/2008 | Grunig et al. | |
| 2008/0083446 A1 | 4/2008 | Chakraborty et al. | 136/205 |
| 2008/0088464 A1 | 4/2008 | Gutierrez | 340/606 |
| 2008/0114911 A1 | 5/2008 | Schumacher | 710/72 |
| 2008/0123581 A1 | 5/2008 | Wells et al. | |
| 2008/0141769 A1 | 6/2008 | Schmidt et al. | 73/204.19 |
| 2008/0268784 A1 | 10/2008 | Kantzes et al. | 455/66.1 |
| 2008/0273486 A1 | 11/2008 | Pratt et al. | 370/328 |
| 2008/0280568 A1 | 11/2008 | Kielb et al. | 455/74.1 |
| 2008/0310195 A1 | 12/2008 | Seberger et al. | 363/26 |
| 2009/0015216 A1 | 1/2009 | Seberger et al. | 323/234 |
| 2009/0046732 A1 | 2/2009 | Pratt et al. | 370/406 |
| 2009/0066587 A1 | 3/2009 | Hayes et al. | 343/702 |
| 2009/0081957 A1 | 3/2009 | Sinreich | 455/68 |
| 2009/0083001 A1 | 3/2009 | Huisenga et al. | 702/185 |
| 2009/0102449 A1* | 4/2009 | Chang et al. | 323/311 |
| 2009/0120169 A1 | 5/2009 | Chandler et al. | 73/54.41 |
| 2009/0134861 A1* | 5/2009 | Saeki et al. | 323/299 |
| 2009/0145656 A1 | 6/2009 | Tschudin | 174/521 |
| 2009/0146502 A1 | 6/2009 | Sinreich | 307/104 |
| 2009/0167613 A1 | 7/2009 | Hershey et al. | 343/702 |
| 2009/0195222 A1 | 8/2009 | Lu et al. | 322/3 |
| 2009/0200489 A1 | 8/2009 | Tappel et al. | 250/492.3 |
| 2009/0250340 A1 | 10/2009 | Sasaki et al. | 204/298.02 |
| 2009/0253388 A1 | 10/2009 | Kielb et al. | 455/117 |
| 2009/0260438 A1 | 10/2009 | Hedtke | 73/579 |
| 2009/0309558 A1 | 12/2009 | Kielb | 323/234 |
| 2009/0311971 A1 | 12/2009 | Kielb et al. | |
| 2009/0311975 A1 | 12/2009 | Vanderaa et al. | 455/90.3 |
| 2009/0311976 A1 | 12/2009 | Vanderaa et al. | 455/90.3 |
| 2010/0000316 A1 | 1/2010 | Fehrenbach et al. | 73/295 |
| 2010/0109331 A1 | 5/2010 | Hedtke et al. | |
| 2010/0156175 A1* | 6/2010 | Wei | 307/31 |
| 2010/0254900 A1 | 10/2010 | Campbell et al. | 424/1.65 |
| 2011/0053526 A1 | 3/2011 | Strei et al. | 455/90.3 |
| 2012/0299564 A1* | 11/2012 | Howes et al. | 323/281 |
| 2013/0079895 A1 | 3/2013 | Hedtke | 700/9 |
| 2013/0207624 A1* | 8/2013 | Aaltonen et al. | 323/234 |

FOREIGN PATENT DOCUMENTS

| | | |
|---|---|---|
| CN | 1130435 A | 9/1996 |
| CN | 1251953 | 5/2000 |
| CN | 1 429 354 A | 7/2003 |
| CN | 1 442 822 A | 9/2003 |
| CN | 100386602 C | 4/2005 |
| CN | 1969238 | 5/2007 |
| CN | 101821686 | 9/2010 |
| CN | 102067048 | 5/2011 |
| CN | 202694194 | 1/2013 |
| DE | 2710211 | 9/1978 |
| DE | 3340834 A1 | 5/1985 |
| DE | 3842379 | 6/1990 |
| DE | 196 22 295 | 5/1996 |
| DE | 201 07 112 U1 | 7/2001 |
| DE | 101 04 582 A1 | 10/2001 |
| DE | 10041160 | 3/2002 |
| DE | 102 21 931 A1 | 5/2002 |
| DE | 10 2004 020 393 | 11/2005 |
| EP | 0 518 916 B1 | 2/1991 |
| EP | 0 524 550 A1 | 1/1993 |
| EP | 0729294 | 8/1996 |
| EP | 0 895 209 A1 | 2/1999 |
| EP | 0 945 714 | 9/1999 |
| EP | 1 202 145 A1 | 5/2002 |
| EP | 1 192 614 | 1/2003 |
| EP | 1 293 853 A1 | 3/2003 |
| EP | 1879294 | 1/2008 |
| FI | FL 118699 B | 2/2008 |
| GB | 1 397 435 A | 6/1975 |
| GB | 2 403 043 | 6/2004 |
| JP | 2-35803 | 2/1990 |
| JP | 02067794 | 7/1990 |
| JP | 4-335796 | 11/1992 |
| JP | 8-125767 | 5/1996 |
| JP | 8-249997 | 9/1996 |
| JP | 9-065441 | 3/1997 |
| JP | 09-182308 | 7/1997 |
| JP | 2001-524226 | 11/2001 |
| JP | 2002369554 | 12/2002 |
| JP | 2003/042881 | 2/2003 |
| JP | 2003-051894 | 2/2003 |
| JP | 2003051894 | 2/2003 |
| JP | 2003134261 | 5/2003 |
| JP | 2003-195903 | 7/2003 |
| JP | 2004021877 | 1/2004 |
| JP | 2004 146254 | 5/2004 |
| JP | 2004208476 | 7/2004 |
| JP | 2004-317593 | 11/2004 |
| JP | 2005-122744 | 5/2005 |
| JP | 2005-207648 | 7/2005 |
| JP | 2006-014589 | 1/2006 |
| JP | 2006-180603 | 7/2006 |
| JP | 2007-200940 | 8/2007 |
| JP | 2008-17663 | 1/2008 |
| JP | 2008-504790 | 2/2008 |
| JP | 2008-511938 | 4/2008 |
| JP | 2009-106145 | 5/2009 |
| JP | 2010-530211 | 9/2010 |
| JP | 2010-541099 | 12/2010 |
| RU | 2 131 934 C1 | 6/1999 |
| RU | 2168062 | 5/2001 |
| RU | 2342639 C2 | 8/2003 |

(56) References Cited

FOREIGN PATENT DOCUMENTS

| | | |
|---|---|---|
| RU | 2003128989 | 1/2007 |
| WO | WO 91/13417 | 9/1991 |
| WO | WO 95/07522 | 3/1995 |
| WO | WO 96/12993 | 5/1996 |
| WO | WO 99/53286 | 10/1999 |
| WO | WO 01/01742 | 1/2001 |
| WO | WO 01/48723 | 7/2001 |
| WO | WO 01/51836 | 7/2001 |
| WO | WO 01/76148 | 10/2001 |
| WO | WO 02/05241 | 1/2002 |
| WO | WO 03/023536 | 3/2003 |
| WO | WO 03/089881 | 10/2003 |
| WO | WO 2004/038998 | 5/2004 |
| WO | WO 2004/082051 | 9/2004 |
| WO | WO 2004/094892 | 11/2004 |
| WO | WO 2005/060482 | 7/2005 |
| WO | WO 2005/086331 | 9/2005 |
| WO | WO 2006/026749 | 3/2006 |
| WO | WO 2006/109362 | 10/2006 |
| WO | WO 2007/002769 | 1/2007 |
| WO | WO 2007/031435 | 3/2007 |
| WO | WO 2007/037988 | 4/2007 |
| WO | WO 2008/098583 | 8/2008 |
| WO | WO 2009/003146 | 12/2008 |
| WO | WO 2009/003148 | 12/2008 |
| WO | WO 2009/063056 | 5/2009 |

OTHER PUBLICATIONS

International Search Report and Written Opinion for PCT Application No. PCT/US2012/061281, dated Jan. 22, 2013, 14 pages.
U.S. Appl. No. 12/855,128, filed Aug. 12, 2010.
Office Action from Chinese patent Application No. 200580006438.X transmitted Jul. 9, 2008.
Examiner's Consultation from European patent Application No. 05724190.3, dated Jun. 30, 2008.
The second Office Action from Chinese patent Application No. 2005800142124 filed May 5, 2005.
First Office Action from Russian patent application No. 2006145434 dated Oct. 5, 2007.
Office Action from European Application No. 05746241.8, dated Aug. 29, 2007.
Decision on refusal to grant a patent for invention for Russian patent application No. 2006145434, filed May 5, 2005.
"Wireless R&D Aims to Boost Traffic," by M. Moore, InTech with Industrial Computing, Feb. 2002, pp. 40-41.
"System Checks Faraway Machines' Health," by J. Strothman, InTech with Industrial Computing, Feb. 2002, pp. 42-43.
Notification of Transmittal of the International Search Report or the Declaration—PCT/US03/10403 dated Aug. 13, 2003.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. ii, iii, iv and 1-12, Dec. 2003.
International Search Report and Written Opinion of Application No. PCT/US2005/015848 dated Aug. 10, 2005.
The third Office Action from Chinese patent Application No. 200580014212.4, dated Dec. 19, 2008.
"Wireless Dual Analog Input Interface Transmitter Installation and User's Manual", by Honeywell International Inc., Phoenix, Arizona, pp. ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
The International Search Report and Written Opinion in Appln No. PCT/US2005/021757 dated Feb. 13, 2006.
International Search Report for International Application No. PCT/US 03/27561, filed Mar. 9, 2003, dated Jun. 15, 2004.
2002 Microchip Technology Inc., "Stand-Alone CAN Controller with SPI™ Interface," pp. 1-75, Mar. 1, 2002.
Rosemount Reference Manual 00809-0100-4022,Rev AA, Jul. 2002, "Model 4600 Oil & Gas Panel Transmitter," 65 pages.
Transmitter Schematic, Sold Jul. 2002, 5 pages.
4 Pages from Website http://content.honeywell.com/imc/eznews/eznews0403/news.htm 2004.
Notification of Transmittal of the International Search Report and the Written Opinion for the international patent application No. PCT/US2010/047463 dated Dec. 1, 2010.
Notification of Transmittal of the International Search Report and the Written Opinion of the International Searching Authority for International Application No. PCT/US2006/025206 dated Nov. 10, 2006.
"Mechatronic Drives in Mobile Hydraulics," Internet Article, Soncebox News. No. 4, Oct. 2004.
Office Action from European Application No. 05853808.3, dated Nov. 6, 2007.
The International Search Report and Written Opinion in Application No. PCT/US2009/003621, dated Sep. 30, 2009.
USA & Metric Thread Standards http://www.carrlane.com/Catalog/index.cfm/29425071F0B221118070C1C513906103E0B05543B0B012009083C3B285357474A2D020609090C0015312A36515F554A5B.
The International Search Report and Written Opinion in Application No. PCT/US2006/035728, dated Jan. 12, 2007.
"Notification of Transmittal of the International Search Report and the Written Opinion of the International Searching Authority" for PCT/US2008/011451 dated Mar. 30, 2009.
The International Search Report and Written Opinion in Application No. PCT/US2009/003616, dated Jan. 13, 2010.
First Examination Report for Indian patent application No. 4676/CHENP/2006 dated Apr. 17, 2009.
Second Examination Report for Indian patent application No. 4676/CHENP/2006 dated Apr. 8, 2010.
The International Search Report and Written Opinion in Application No. PCT/US2009/003636, dated Oct. 6, 2009.
The International Search Report and Written Opinion in Application No. PCT/US2009/003611, dated Nov. 4, 2009.
Rejection Notice for Japanese patent application No. 2007527282 dated Jul. 22, 2010.
Summons to attend oral proceedings for the European application No. 05746241.8 dated May 26, 2010.
The sixth Office Action from Chinese application No. 2005800014212.4, dated Aug. 17, 2010.
Conclusion and Notification on rehearing for Russian patent application No. 2006145434/09 issued on Sep. 17, 2010.
The seventh Office Action from Chinese patent application No. 200580014212.4 issued on Jan. 31, 2011.
The fourth Office Action from Chinese patent application No. 200580014212.4 issued on Jul. 24, 2009.
Official Letter from Mexican patent application No. PA/A/2006/013488 dated Jun. 25, 2009.
Notification of Transmittal of the International Search Report and the Written Opinion for International application No. PCT/US2009/062152 dated Jun. 2, 2010.
First Office Action for Chinese application No. 200780018710.5 dated May 12, 2010.
First Office Action for Chinese patent application 200680015575.4, filed Jun. 27, 2006.
Search Report and Written Opinion for international patent application No. PCT/US2009/002476, dated Apr. 21, 2009.
Third Office Action from Chinese patent application No. 200580006438.X, dated Sep. 28, 2009.
Second Official Action from Russian patent application No. 2008116682, dated Apr. 13, 2009.
First Official Action from Russian patent application No. 2006134646, dated Mar. 12, 2008.

(56) References Cited

OTHER PUBLICATIONS

First Official Action from Russian patent application No. 2008103014, dated Jun. 9, 2009.
First Communication from European patent application No. 06803540.1, dated Jun. 30, 2008.
Fifth Office Action from Chinese patent application No. 200580014212.4, dated Nov. 13, 2009.
Second Office Action for Chinese patent application No. 200680015575.4, dated Sep. 25, 2009.
Third Official Action for Russian patent application No. 2008116682, dated Sep. 11, 2009.
Notification on Results of Examining the Invention for Patentability from Russian patent application No. 2006145434 dated Aug. 1, 2008.
First Rejection Notice issued for Japanese patent application No. 2007-527282 dated Dec. 14, 2009.
Second Office Action from Russian patent application No. 2006145434 dated Apr. 2, 2008.
First Office Action from Chinese Patent Application No. 2005800142124 dated Mar. 14, 2008.
First Official Action from Russian patent application 2008116682, dated Jan. 16, 2009.
Second Office Action from Chinese patent application 200580006438.X, dated Apr. 10, 2009.
Examination Report of the European Patent Office in Application No. 05724190.3 dated Aug. 1, 2007.
The Official Communication from European patent application No. 05746241.8 dated Nov. 12, 2010.
The Minutes in accordance with Rule 124(4) EPC for European application No. 05746241.8 dated Nov. 4, 2010.
Communication pursuant to Rules 161 and 162 EPC from European patent application No. 09767057.4 dated Jan. 26, 2011.
Communication pursuant to Rules 161 and 162 EPC from European patent application No. 09767063.2 dated Jan. 28, 2011.
Communication from corresponding EP application No. 08837236.2 dated Nov. 3, 2010.
Notification of Transmittal of the International Search Report and the Written Opinion for the international patent application No. PCT/US2010/047444 dated Dec. 10, 2010.
Third Office Action for Chinese patent application No. 200680015575.4, dated Jun. 2010.
Fourth Official Action for Russian patent application No. 2008116682, dated Dec. 18, 2009.
English machine translation of JP2004208476 A.
"Every Little Helps," Economist, vol. 278, No. 8469, p. 78, Mar. 18, 2006.
"Thermal Design and Heat Sink Manufacturing & Testing—Total Thermal and Heat Sink . . . ," http://www.enertron-inc.com/enertron-products/integrated-heat-sink.php, Mar. 31, 2006.
Zahnd et al., "Piezoelectric Windmill: A Novel Solution to Remote Sensing," Japanese Journal of Applied Physics, v. 44, No. 3, p. L104-L105, 2005.
"Heat Pipe—Wikipedia, the free encyclopedia," http://en.wikipedia.org/wiki/Heat_pipe, Mar. 31, 2006.
"High Power Single PSE Controller With Internal Switch," Linear Technology LTC4263-1, p. 1-20.
Office Action from European patent application No. 07837769.4, dated Jul. 14, 2009.
First Office Action from Australian patent application No. 2005248759, dated Apr. 30, 2009.
Second Office Action from Australian patent application No. 2005248759, dated Aug. 28, 2009.
Decision on Refusal to Grant from Russian patent application No. 2006145434 dated Feb. 18, 2011.
Office Action from corresponding European Application No. EP 09767062.4, dated Jul. 13, 2011, 5pgs.
Official Action for the corresponding Russian patent application No. 2011101386 transmitted Dec. 23, 2011.
Office Action from Chinese Patent Application No. 200880110323.9, dated Jan. 29, 2012.
Written Opinion from Singapore Patent Application No. 201009093-4, dated Feb. 20, 2012.
Written Opinion and Search Report from the related Singapore patent application No. 201009226-0 dated Mar. 16, 2012.
Office Action from the related Russian patent application No. 2011101364 dated Feb. 8, 2012.
Communication Pursuant to Rules 161(1) and 162 EPC for application Serial No. EP 09767062.4, dated Jan. 27, 2011.
Office Action from Chinese Application No. 200980122611.0 dated Nov. 23, 2011, 5 pgs.
The International Search Report from PCT Application No. PCT/US2011/047026, dated Jul. 11, 2011, 4 pgs.
The Written Opinion from International Search Report from PCT Application No. PCT/US2011/047026, dated Jul. 11, 2011, 8 pgs.
Communication Pursuant to Rules 161(1) and 162 EPC for application Serial No. EP 10752246.8, dated May 3, 2012.
Written Opinion for the related Singapore patent application No. 2010092278 dated Feb. 16, 2012.
Written Opinion for the related Singapore patent application No. 2010092245 dated Jan. 6, 2012.
Japanese Office Action from JP 2011-514605, dated Jun. 19, 2012.
Communication Pursuant to Rules 161(1) and 162 EPC for application Serial No. EP 10765871.8, dated Apr. 27, 2012.
Office Action from Russian patent application No. 2011101386 dated Apr. 23, 2012, 4 pages.
Chinese Office Action from CN200980122835.1, dated Jul. 3, 2012.
Chinese Office Action from CN200980122761.1, dated Aug. 31, 2012.
First Office Action from Japanese patent application No. 2011514603, dated Jul. 10, 212.
First Office Action from Chinese patent application No. 200980122613.X, dated Aug. 15, 2012.
Second Office Action from Chinese patent application No. 200980122611.0 dated Aug. 20, 2012.
Official Action from Canadian patent application No. 2563337 dated Sep. 4, 2012.
Official Action from Russian patent application No. 2009139488, dated Oct. 8, 2012. 3 pages.
Examination Report for the related Singapore application No. 201009226-0 dated Oct. 12, 2012.
Invitation to Response to Written Opinion for Singapore application No. 201009093-4 dated Nov. 5, 2012.
Official Action from the related Canadian patent application No. 2726613 dated Jan. 11, 2013.
Official Action from the related Canadian patent application No. 2726608 dated Dec. 5, 2012.
Examination Report from the related Singapore patent application No. 2010092278 dated Jan. 7, 2013.
Decision of Rejection (final rejection) for Japanese Patent Application No. 2011-514604, dated Jan. 29, 2013, 8 pages.
Second Office Action for Chinese Patent Application No. 200980122835.1, dated Mar. 15, 2013, 20 pages.
Official Action for Canadian Patent Application No. 2,726,601, dated Apr. 12, 2013, 3 pages.
Second Office Action from Chinese patent application No. 200980122613.X, dated May 9, 2013.
First Office Action from the related Japanese patent application No. 2012-527988, dated May 14, 2013.
Office Action from the realated Japanese patent application No. 2012527994 dated Jun. 11, 2013.
Office Action from Chinese patent application No. 200980122835.1 dated Sep. 24, 2013.
Rejection Notice from JP 2011-514611, dated Aug. 20, 2012, 5 pgs.
International Search Report and Written Opinion from Application No. PCT/US2012/061281, dated Jan. 22, 2013.
Office Action from Chinese Patent Application No. 20110213726.X, dated Nov. 29, 2013.
Office Action from Chinese Patent Application No. 200980122761.1, dated Dec. 12, 2013.
Office Action from Japanese Patent Application No. 2013-524161, dated Jan. 28, 2014.
Office Action from Chinese Patent Application No. 200980122613.X, dated Jan. 17, 2014.

(56) References Cited

OTHER PUBLICATIONS

Office Action from Chinese Application No. 200980122835.1, dated Apr. 9, 2014.
Office Action from Application No. CN201210042907.5, dated Apr. 1, 2014.
Communication from EP Application No. 12787964.1, dated Jun. 25, 2014.
Examination Report of the European Patent Office from EP No. 05724190.3, dated Aug. 1, 2007.
Office Action from Russian Application No. RU 2013110497, dated Jul. 18, 2014.
Second Office Action from Chinese Patent Application No. 20110213726.X, dated Apr. 28, 2014.
Office Action from Chinese patent 201210057973.X dated Nov. 28, 2013.
Office Action from Chinese patent 201210057973.X dated Jul. 31, 2014.
Office Action from Canadian patent application No. 2,808,174, dated Aug. 20, 2014.
Office Action from Chinese patent 200110213726.X dated Aug. 28, 2014.
Second Office Action from Chinese patent application No. 200680035248.5, dated Oct. 19, 2011.
Office Action from Japanese Patent Application No. 2013-524161, dated Dec. 2, 2014.
Communication from EP Application No. 12787964.1, dated Mar. 9, 2015.
Office Action from Japanese Patent Application No. 2014-538858, dated Apr. 7, 2015.
Office Action from Chinese Patent Application No. 201210042907.5, dated May 14, 2015.
Office Action from European Patent Application No. 11754949.3, dated Sep. 7, 2015.
Office Action from Canadian Patent Application No. 2,808,174, dated Oct. 2, 2015.
Communication from European Patent Application No. 10752246.8, dated Sep. 8, 2015.
International Search Report and Written Opinion of Application No. PCT/US2010/047744 dated Dec. 10, 2010.
Office Action from Chinese Patent Application No. 201210042907.5, dated Nov. 3, 2015.

* cited by examiner ure invention.

POWER SUPPLY FOR INDUSTRIAL PROCESS FIELD DEVICE

BACKGROUND OF THE INVENTION

The present invention relates to industrial process control and monitoring systems. More specifically, the present invention relates to wireless field devices used in industrial process control and/or monitoring systems.

Industrial processes are used in many industries to process or transport various materials. Industrial processes are implemented in, for example, oil refineries, food manufacturing facilities, paper pulp manufacturing facilities, etc.

Operation of an industrial process typically requires the monitoring of process variable. Example process variables include temperature, pressure, flow rate, level, etc. A process variable transmitted is used to measure a process variable and transmit information of the measured process variable to a central location. This information can used to monitor the process and can be used to control the process. For example, a valve can be adjusted using another type of field device, a control device, based upon a measured flow rate.

Traditionally, process variable transmitters have communicated with a central location using a wired connection. An example of a wired connection is a two wire process control loop in a current loop through the loop is representative of a measured process variable. Other communication techniques include transmitting digital information on the process control loop. The same two wire process control loop can be used to provide power to the field device.

Wireless field devices are used to measure process variables and communicate with another location and do not require the wired connection described above. One wireless communication technique uses a mesh network configuration. One example communication protocol is the Wireless HART® communication protocol in accordance with the IEC 62591 Standard. One benefit of a wireless device is that it does not require wires to be extended from a central control location to the field device. A further reduction in wiring can be achieved if the field device includes an internal power supply such as a battery. However, if the field device is battery operated, the device will cease operation if its power source is depleted. Therefore, it is often desirable to take steps to reduce power consumption in the field device in order to extend the life of the power source.

SUMMARY

A wireless industrial process field device for use in controlling or monitoring a process variable of an industrial process includes a process interface element configured to sense or control the process variable of the industrial process. Process device circuitry includes a process interface circuit configured to measure or control the process variable of the industrial process with the process interface element. Wireless communication circuitry is configured for wireless communication. Power supply circuitry is configured to provide power to the process device circuitry from a power storage element at an output voltage. A low drop out (LDO) voltage regulator is configured to reduce the output voltage. A boost converter is configured to increase the output voltage.

DETAILED DESCRIPTION

The present invention provides a power supply circuit for a wireless field device such as a process variable transmitter or process controller. The power supply circuit includes a boost includes a boost converter and a Low Drop Out (LDO) regulator which can be selectively to power circuitry of the field device. The combination of LDO and boost converter is used to increase the battery life. A comparator is used to switch between the boost and LDO.

Figure 1:
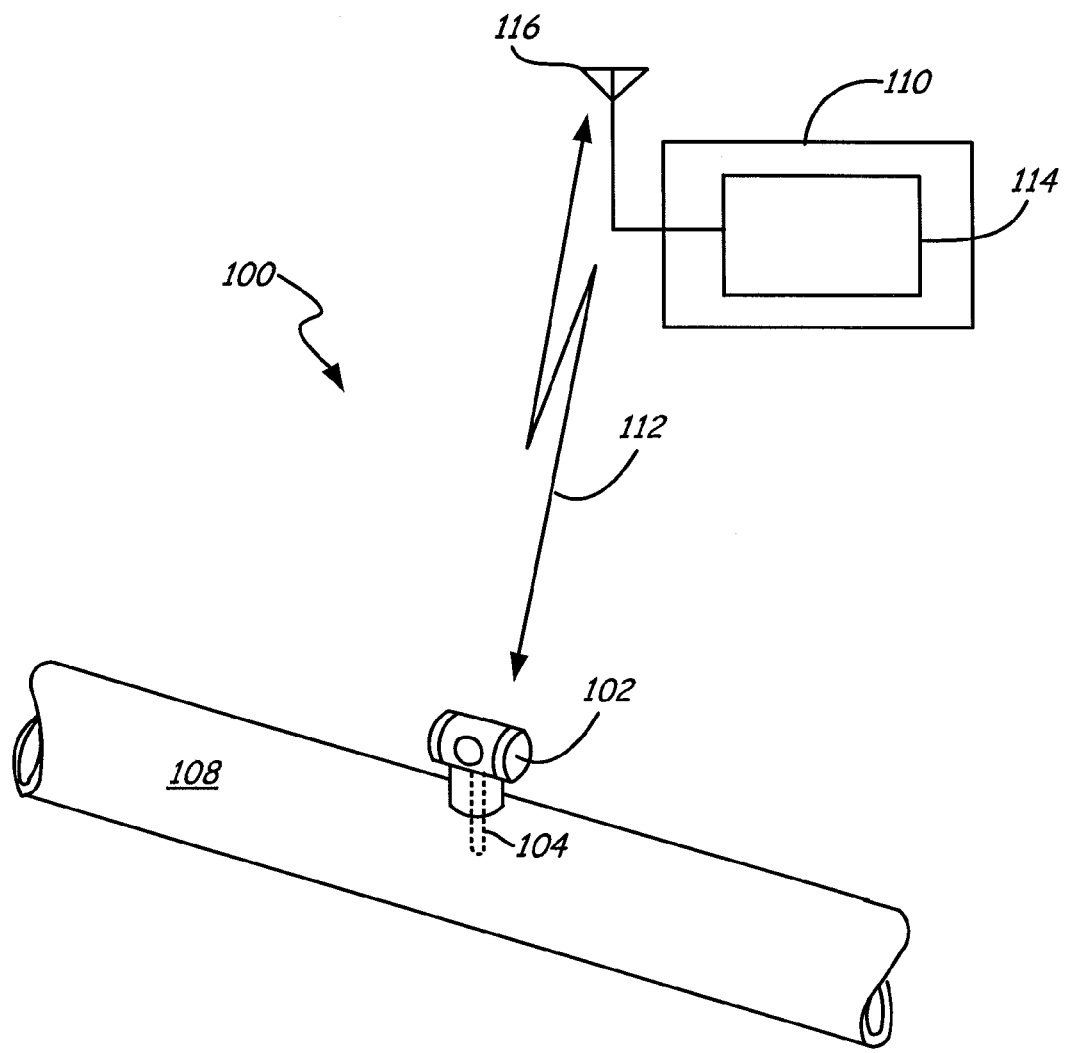
FIG. 1 is a simplified diagram of a industrial process control or monitoring system including a wireless field device.

FIG. 1 is a simplified diagram of an industrial process control or monitoring system 100 in which a field device such as process field device 102 interfaces with a process fluid 108 through a process interface element 104. The process fluid 108 is contained in, for example, process piping 106. The field device 102 can be configured as a process variable transmitter, in which the process interface element 104 can comprise a sensor to sense a process variable of the process fluid 108. Examples include temperature, flow rate, level, etc.

Process field device 102 communicates with another location, such as location 110, over wireless communication link 112. Location 110 includes communication circuitry 114 coupled to an antenna 116 which is used to establish communication link 112. Location link 110 can, for example, be a central control room or the like in which operation of the process is monitored or controlled. The wireless communication link 112 can be in accordance with any of the communication protocol technique or standard. One example is the Wireless HART® communication protocol in accordance with the IEC 62591 Standard.

Figure 2:
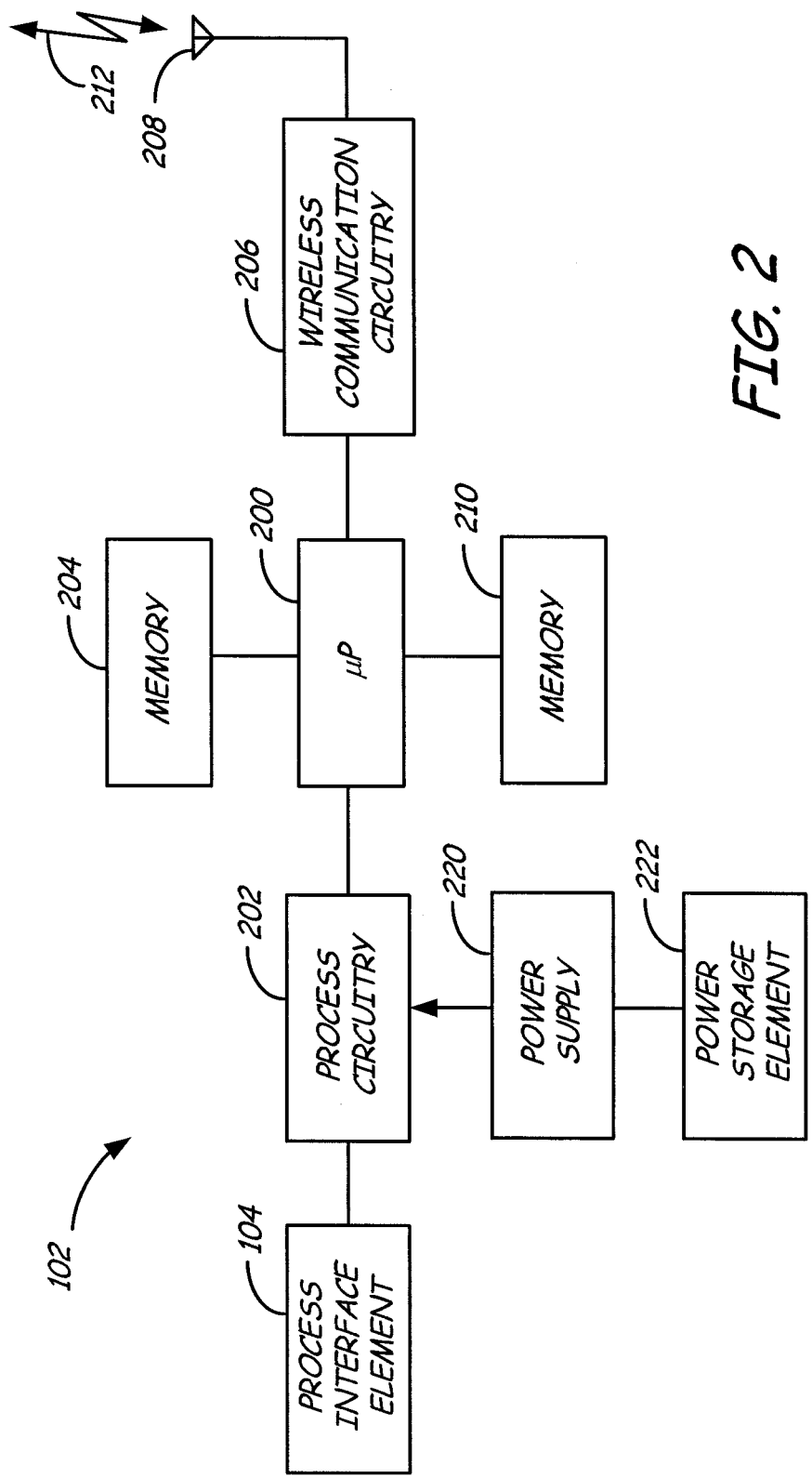
FIG. 2 is simplified block diagram of the wireless field device of FIG. 1.

FIG. 2 is a simplified block diagram of process field device 102. As illustrated in FIG. 2, a microprocessor 200 is coupled to the process interface element 104 through process circuitry 202. Process circuitry 202 can comprise, for example, an amplifier, analog to digital converter, etc. In such a configuration, a digital representation of a sensed process variable is provided to the microprocessor 200. Microprocessor 200 operates in accordance with instructions stored in memory 204 and couples to wireless communication circuitry 206. The wireless communication circuitry 206 couples to an antenna 208 which is linked to the communication link 112 shown in FIG. 1. Using this configuration, the transmitter 102 can receive or transmit information on the communication link 112. An optional local input/output (I/O) circuit 210 is shown. For example, I/O circuit 210 can be used by an operator to locally control the transmitter 102. FIG. 2 also illustrates a power supply 220 coupled to a power storage element 222. Power supply 220 is used to provide power to circuitry of the process variable 102 from power storage element 222 as discussed below in more detail. Power storage element 222 may comprise any appropriate device which is capable of storing sufficient power as desired. Examples include a battery, a rechargeable battery, an electrical capacitor, including a bulk or "super" capacitor.

The various circuit components of process field device 102 are configured to operate based upon a stable power source. For example, a stable power supply of 3.0 volts may be required. However, the voltage provided by power storage element 222 may vary from between 2.0 to 3.7 volts during its change or discharge cycle. In such a configuration, a "Buck-Boost" converter is typically used in which a single converter is used to both boost a DC voltage to obtain a desired output voltage as well as decrease a DC voltage to obtain the desired output voltage. However, the Buck-Boost converter consumes additional power from the power storage element thereby shortening battery life.

During operation, the process field device 102 senses a process variable using a process variable sensor such as process interface element 104. Microprocessor 200 is used to control operation of the process field device 102 and transmit information related to the sensed process variable on communication link 112 using wireless communication circuitry 206. In order to increase the life of power storage element 222, the circuitry of process field device 102 may enter a "sleep" or reduced power mode. Typically, the process field device 102 may operate in a reduced power mode more than 90% of the time. In such a configuration, the circuitry only requires tens of microwatts of power for operation. For example, the wireless communication circuitry 206 can be turned off or idled, the speed of microprocessor 200 can be reduced, the process circuitry 202 can be disabled, etc. During active times, this circuitry is powered up and the power requirements may go as high as tens of milliwatts. When the power storage element 220 voltage is above 3.0 volts, the power supply circuitry 220 must reduce the voltage to 3.0 volts for powering the circuitry of the field device 102. Similarly, when the power storage element 220 voltage dips below 3.0 volts, the power supply 220 circuitry must boost the voltage to 3.0 volts to properly power the field device 102 circuitry. Prior art techniques have used "Buck-Boost" converter. However, the quiescent power draw of such a "Buck-Boost" circuit may be tens of microwatts which will significantly reduce the life of the power storage element 222.

Figure 3:
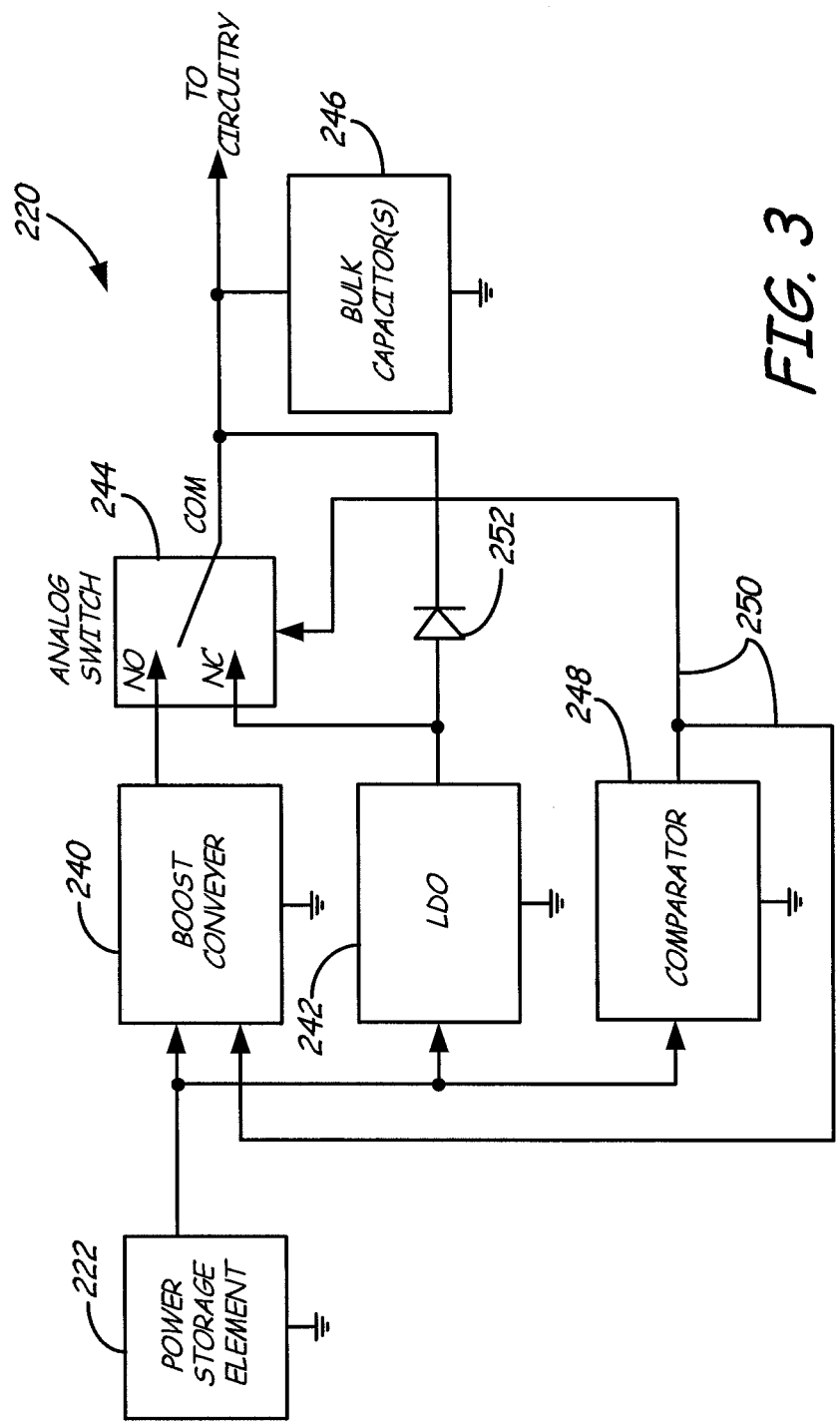
FIG. 3 is a simplified schematic diagram showing a power supply of the wireless field device of FIG. 1 in accordance with one example embodiment of the present invention.

FIG. 3 is a simplified block diagram of power supply circuitry 220 in accordance with one example embodiment of the present invention. Power supply circuitry 220 includes a boost converter 240 and an LDO (low drop out) or "LDO" converter 242. Boost converter 240 and LDO converter 242 can operate in accordance with standard techniques. For example, the boost converter can comprise a switched-mode or other step-up power supply. The boost converter 240 is configured to receive a voltage from power storage element 222 which is less than 3 volts and provide an output voltage which is regulated 3.0 volts. Similarly, the LDO converter 242 is configured to receive a voltage from the power storage element 222 which is greater than 3 volts and provide a regulated output which is 3.0 volts. An analog switch 244 is configured to selectively couple either the output from converter 240 or the output from converter 242 to bulk capacitor(s) 246. This output is used to provide power to circuitry of the process field device 102. Operation of the analog switch 244 is controlled by a comparator 248 which has a threshold set to the desired switch over point in the output voltage of power storage element 222, i.e. 3.0 volts. The comparator 250 is also used to control operation of boost converter 240 whereby boost converter 240 is turned "off" if the battery voltage is greater than the desired threshold. This saves power because the boost converter 240 operates only when its functioning is required. A diode 252 is connected across the analog switch 244 and bulk capacitor(s) 246 and operates to provide a power supply voltage to circuitry of the process field device 102 during the switching transition and improves the settling time of the boost converter 240.

When the power required by the circuitry of the field device is low, the loss through the LDO converter 242 will be larger when compared to the other circuitry. This can be seen in Equation 1.

LDO Loss=(Battery Voltage−3)×$I_{Load}$+Quiescent Power  Equation 1

Equation shows that for low load currents, the power loss is less than when compared to a traditional Buck-Boost converter. As a basis for comparison, a power supply in accordance with FIG. 3 was tested and compared to a traditional Buck-Boost converter. Table 1 is a tabulation of experimental results for different loads applied to a traditional Buck-Boost converter and the parallel LDO/boost converter configuration shown in FIG. 3:

TABLE 1

| Test Number | Buck-Boost Converter | | LDO and Boost Converter (FIG. 3) | | Increase in battery life (%) |
| --- | --- | --- | --- | --- | --- |
| | Average Current (uA) | Battery Life (Years) | Average current (uA) | Battery Life (Years) | |
| 1 | 117.84 | 15.02 | 98.07 | 18.04 | 20.15% |
| 2 | 130.72 | 13.54 | 108.33 | 16.33 | 20.67% |
| 3 | 107.46 | 16.47 | 89.57 | 19.76 | 19.97% |
| 4 | 218.79 | 8.09 | 181.76 | 9.73 | 20.37% |
| 5 | 192.64 | 9.18 | 156.24 | 11.32 | 23.30% |
| 6 | 180.38 | 9.81 | 151.61 | 11.67 | 18.98% |

Although the present invention has been described with reference to preferred embodiments, workers skilled in the art will recognize that changes may be made in form and detail without departing from the spirit and scope of the invention. Although the discussion above is directed specifically to the process interface element 104 as comprising a process variable sensor, in some configurations the process interface 105 comprises a control element which is used to control operation of the process in response to an output from microprocessor 200.

What is claimed is:

1. A wireless industrial process field device for use in controlling or monitoring a process variable of an industrial process, comprising:
   a process interface element configured to sense or control the process variable of the industrial process;
   process device circuitry, comprising:
      a process interface circuit configured to measure or control the process variable of the industrial process with the process interface element;
      wireless communication circuitry configured for wireless communication;
   a power storage element having a voltage output;
   power supply circuitry configured to provide power to the process device circuitry from the power storage element at an output voltage, the power supply circuitry comprising:
      a low drop out (LDO) voltage regulator configured to reduce a voltage of the power storage element and provide the reduced voltage as the output voltage to the process device circuitry when the voltage output of the power storage element is above a threshold;
      a boost converter configured to increase the voltage of the power storage element and provide the increased voltage as the output voltage to the process device circuitry when the voltage output of the power storage element is below the threshold;
      a comparator configured to turn the boost converter off if the voltage output from the power storage element is greater than the threshold;
      a bulk capacitor coupled to the process device circuitry and configured to store power;

a diode which couples the low drop out (LDO) voltage regulator to the process device circuitry; and an analog switch responsive to an output from the comparator to connect an output of the low drop out (LDO) voltage regulator to the process device circuitry if the voltage output from the power storage element is greater than the threshold and further configured to connect an output of the boost converter to the process device circuitry if the voltage output from the power storage element is less than the threshold wherein the diode is connected in parallel with the analog switch and in series between the low drop out (LDO) voltage regulator and the bulk capacitor.

2. The wireless industrial process field device of claim 1 including the comparator configured to selectively couple the low drop out voltage regulator and alternatively the boost converter to the process device circuitry.

3. The wireless industrial process field device of claim 1 wherein the comparator couples the boost converter to the process device circuitry if the output voltage is less than the threshold.

4. The wireless industrial process field device of claim 1 wherein the comparator couples the low drop out converter to the process device circuitry if the output voltage is greater than the threshold.

5. The wireless industrial process field device of claim 3 wherein the threshold comprises 3.0 volts.

6. The wireless industrial process field device of claim 2 wherein an output of the comparator is coupled to the boost converter.

7. The wireless industrial process field device of claim 6 wherein the comparator disables operation of the boost converter to thereby reduce power consumption if the low drop out voltage regulator is coupled to the process device circuitry.

8. The wireless industrial process field device of claim 1 wherein the bulk capacitor coupled to the process device circuitry configured to store power from the power supply circuitry.

9. The wireless industrial process field device of claim 1 wherein the power storage element is selected from the group of power storage elements comprising a battery or a capacitor.

10. A method of powering a wireless industrial process field device of the type used in controlling or monitoring a process variable of an industrial process, comprising:

providing a process interface element configured to sense or control the process variable of the industrial process;

providing process device circuitry configured to operate with the process interface element, wherein the process device circuitry includes wireless communication circuitry configured for wireless communication;

coupling a bulk capacitor to the process device circuitry to store power;

providing a voltage output from a power storage element;

when the voltage output of the power storage element is above a threshold, selectively coupling the process device circuitry to an output of a first converter that provides a reduced voltage formed by reducing the voltage output of the power storage element, wherein the first converter is coupled to the process device circuitry through a series connected diode;

when the voltage output of the power storage element is below a threshold, selectively coupling the process device circuitry to an output of a second converter that provides an increased voltage formed by increasing the voltage output of the power storage element;

providing an analog switch configured to selectively couple either the first or second converter to the process device circuitry and the bulk capacitor and wherein the diode is connected in parallel with the bulk capacitor; and turning the second converter off when the voltage output from the power storage element is above the threshold.

11. The method of claim 10 wherein selectively coupling comprises coupling an output of a boost converter to the process device circuitry if the output voltage is less than the voltage threshold.

12. The method of claim 10 wherein selectively coupling comprises coupling a low drop out converter to the process device circuitry if the output voltage is greater than the voltage threshold.

13. The method of claim 10 wherein the voltage threshold comprises 3.0 volts.

14. The method of claim 10 including disabling operation of a boost converter to thereby reduce power consumption if voltage output is above the threshold.

* * * * *